United States Patent [19]

Fox et al.

[11] Patent Number: 4,517,407
[45] Date of Patent: May 14, 1985

[54] HIGH VOLTAGE CABLE TERMINATOR AND METHOD OF ASSEMBLY

[75] Inventors: James W. Fox, Orland Park; Robert J. Hill, Lockport, both of Ill.

[73] Assignee: G & W Electric Company, Blue Island, Ill.

[21] Appl. No.: 420,820

[22] Filed: Sep. 21, 1982

[51] Int. Cl.³ .................. H02G 15/064; H01R 43/00
[52] U.S. Cl. .................... 174/73 R; 29/857
[58] Field of Search .......... 174/106.2, 106 SC, 106 R, 174/107; 29/857, 860, 868; 874/73 R; 81/471

[56] References Cited

U.S. PATENT DOCUMENTS

| 3,317,655 | 5/1967 | Oatess et al. | 29/828 X |
| 3,396,231 | 8/1968 | Anderson | 174/73 R |
| 3,515,798 | 6/1970 | Sievert | 174/135 |
| 3,585,274 | 6/1971 | Tomaszewski | 174/73 |
| 3,634,604 | 1/1972 | Lusk | 174/73 R |
| 3,644,662 | 2/1972 | Salahshourian | 174/73 R |
| 3,737,556 | 6/1973 | Cunninghan | 174/73 R X |
| 3,796,821 | 3/1974 | Lusk | 174/73 R |
| 3,808,352 | 4/1974 | Johnson | 174/73 R |
| 3,816,640 | 6/1974 | Varner | 174/73 R |
| 4,096,958 | 9/1977 | Lusk | 174/73 R |
| 4,223,179 | 9/1980 | Lusk et al. | 339/250 X |

FOREIGN PATENT DOCUMENTS

| 2231949 | 2/1973 | Fed. Rep. of Germany | 81/471 |
| 2744257 | 1/1977 | Fed. Rep. of Germany | 174/73 R |
| 151392 | 10/1981 | Fed. Rep. of Germany | 174/73 R |
| 2486852 | 1/1982 | France | 81/471 |
| 2074066 | 10/1981 | United Kingdom | 72/88 |

OTHER PUBLICATIONS

3M/PST (Pre-Stretched Tubing) Adapters, Publication by MMM (date unknown).
3M Quick Term II, The Quick and Short of It, Publication by MMM (date unknown).

Primary Examiner—Howard N. Goldberg
Assistant Examiner—Carl J. Arbes
Attorney, Agent, or Firm—Fitch, Even, Tabin & Flannery

[57] ABSTRACT

A novel high voltage power cable terminator of the type having a rigid insulating housing made of an inorganic material is provided which employs a pre-stretched elastomeric stress relief tube mounted on a removable core prior to installation to facilitate installation of the terminator upon a prepared end of a high voltage cable. The removable core is a generally cylindrical, helically grooved tubular structure. The stress relief tube is supported coaxially in a stretched condition upon the exterior of the core prior to installation. To install the stress relief tube on the cable, the prepared end portion of the cable is positioned within the hollow interior of the core, and the core is then removed to allow the elastomeric stress relief tube to contract and grip the peripheral surface of the portion of the cable where stress relief is desired.

8 Claims, 3 Drawing Figures

HIGH VOLTAGE CABLE TERMINATOR AND METHOD OF ASSEMBLY

The present invention relates generally to high voltage cable terminators and more particularly to a novel method and apparatus for terminating high voltage electrical cables.

In making an electrical connection between an insulated, shielded high voltage cable and an unshielded, uninsulated conductor, it is well known to employ a terminator which fits over an end of the insulated cable. One such terminator is described in U.S. Pat. No. 3,796,821 to Lusk.

Prior to installation of a terminator, it is necessary to prepare the end of the cable. A high voltage cable typically employs a multi-stranded axial conductor surrounded by progressively larger coaxial layers of insulation, semi-conducting material, and grounded conductive wire respectively. The two outer layers are commonly known as shielding. To prepare the end of the cable for installation of the terminator, different lengths of the various layers are cut away to expose an end portion of the axial conductor. The greatest length is removed from the outermost layer, and the second greatest length is removed from the next outermost layer, and so on so that a tapered configuration results. When the cable is inserted into the terminator, the axial conductor protrudes beyond the surrounding layers of insulation, semi-conducting material, and shielding wire.

A terminator performs several different functions. First, it provides an electrical connection for carrying high voltage current between an axial conductor of an insulated cable held within the terminator and a second conductor attached to an exterior portion of the terminator. To carry current between the two conductors, a terminator generally employs a metal hood having an axial cavity for receiving the axial conductor of the insulated cable and having external means for engaging the second conductor. To provide a good electrical connection between the first conductor and the hood cavity, it is desirable to maintain a good mechanical connection therebetween. One way of making this connection is to provide a deformable hood which may be crushed onto the conductor with a crimping tool. An alternative is to employ a rigid hood having vertically aligned set screws disposed along one side of it to spread the strands of the cable conductor and press them against the interior of the bore. In using either method, some care must be exercised to obtain satisfactory electrical contact without damaging the conductor strands. The use of set screws is preferred because a special tool is required for crimping. However, to avoid damage to the strands due to over-tightening of the set screws, it may be necessary to use a torque wrench to tighten the set screws.

A second function of the terminator is to prevent external current leakage between the uninsulated conductor and the grounded conductive wire of the insulated cable along the exterior surface of the terminator. The configuration and composition of the housing of the terminator are directed to this function. A basic requirement for the material of the housing is that the material have good insulating properties. In addition, the material should exhibit resistance to tracking, i.e., the formation of a conductive path along the surface of the housing due to electrical arcing adjacent thereto. The material should be resistant to chemicals and weather resistant to avoid cracking or other deterioration when subjected to solar radiation, temperature extremes, wind, and precipitation, and the material should have an exterior surface which does not tend to retain accumulations of dust and dirt. Porcelain has been found to satisfy these criteria and is the preferred material for construction of terminator housings.

A third function of the terminator is to maintain an acceptable voltage gradient within the terminator between the exposed end of the cable conductor, which typically has a potential in excess of 15,000 volts, and the grounded shield. As described in U.S. Pat. No. 3,976,821 to Lusk, the configuration resulting from the preparation of the end of the cable tends to give rise to an extremely high longitudinal voltage gradient, or electrical stress, through a small area along the surface of the insulation adjacent to the semiconducting layer. Such a localized high gradient, or stress concentration, is undesirable because it can break down the insulation. The problem may be avoided by positioning a stress relief element coaxially around the cable insulation adjacent to the cut end of the semiconducting layer to distribute the stress more evenly over a larger area.

Heretofore, one of the more time-consuming tasks involved in field installation of a terminator has been installation of the stress relief element. One common method of installing a stress relief element is to wrap layers of tape having the desired electrical characteristics about the cable to form a winding about the high stress area prior to inserting the cable end into the terminator. Pending U.S. patent application Ser. No. 305,392 describes such a method. While this method is commonly used, it has two disadvantages in that it is time consuming and requires a degree of skill to be done properly. A second approach is to manufacture the terminator with a preformed stress relief element in the housing, so that installation of the stress relief element is accomplished simply by sliding the cable end into the terminator. One such terminator is described in U.S. Pat. No. 3,796,821 to Lusk. While this type of arrangement may reduce installation time, the high cost of producing the molded stress relief elements makes the terminator relatively expensive. A third approach is to use a removable core of the type described in U.S. Pat. Nos. 3,515,798 to Sievert and 3,808,352 to Johnson for installation of the stress relief medium on the cable. While this method is somewhat less time consuming than wrapping layers of tape about the insulation, known terminators which have employed this type of core have been unsatisfactory, primarily due to poor exterior tracking resistance and susceptibility to weather damage.

A fourth function of the terminator is to provide a protective seal around the prepared end of the insulated, shielded high voltage cable. Terminators are commonly used outdoors and exposed to weather. It is desirable that the terminator exclude moisture and dirt which may promote corrosion of the exposed conductor and which may detrimentally alter the voltage gradient within the housing.

SUMMARY OF THE INVENTION

In accordance with the present invention, a novel high voltage power cable terminator of the type having a rigid insulating housing made of an inorganic material is provided which employs a pre-stretched tubular elastomeric stress relief element mounted on a removable core prior to installation to facilitate installation of the terminator upon a high voltage cable which has been prepared as described above. The removable core is a generally cylindrical, helically grooved tubular structure of the type described in U.S. Pat. No. 3,515,798 to Sievert. The stress relief element is supported coaxially in a stretched condition upon the exterior of the core prior to installation. To install the stress relief element on the cable, the prepared end portion of the cable is positioned within the hollow interior of the core, and the core is then removed to allow the stress relief element to contract and grip the peripheral surface of the portion of the cable where stress relief is desired. This procedure is quicker and simpler than forming a stress relief element by wrapping layers of tape about the high stress region of the cable.

An elastomeric sponge sleeve lines the interior of the rigid housing to define a bore of variable diameter to receive the prepared end of the cable after the stress relief element has been mounted upon the cable. The filler excludes air, moisture, and other contaminants from the interior of the housing when the terminator is in assembled relation, and its elastomeric characteristics enable it to accommodate cables of various diameters.

A hood with a hollow conductive bore to receive the axial conductor of the high voltage cable is positioned above the housing. Set screws are disposed in the threaded apertures through the side of the bore to secure the conductor. To facilitate tightening of each set screw to a particular torque with an ordinary wrench rather than a torque wrench, torque limiters for each set screw are provided which transmit torque from a wrench to the set screw while preventing over-tightening. The torque limiters are configured to shear when subjected to a predetermined torsional load, thus limiting the torque transmitted to the set screws. The preferred torque limiter has two hexagonal heads disposed at opposite ends, one to engage a hexagonal socket in a set screw and the other to engage a wrench, with a circumferentially grooved cylindrical middle portion positioned between the heads. When torque is applied in excess of a predetermined limit, the shear stress near the plane of the circumference groove exceeds the strength of the material and the torque limiter breaks into two pieces.

To prevent spreading the conductor strands during assembly, a cap is placed over the cut end of the conductor prior to insertion of the cable end into the terminator and remains in place when the terminator is fully assembled. The bore of the hood is dimensioned to accommodate the cap.

Accordingly, it is a general object of the present invention to provide a new and improved method and apparatus for high voltage cable termination which is relatively simple and inexpensive.

A more specific object of the present invention is to provide a novel high voltage cable terminator which employs a rigid housing in combination with a tubular elastomeric stress relief element which may be installed upon a cable in a stretched condition by use of a removable core which supports the stress relief element in a highly stretched condition prior to installation.

Another object of the present invention is to provide a terminator of the type having a plurality of set screws disposed in a conductive bore to provide a good electrical connection between the interior of the bore and a stranded conductor positioned within the bore wherein torque limiters are provided to facilitate tightening of the set screws to a predetermined torque without a torque wrench.

Further objects and advantages of the present invention, together with the method of installation thereof, will become apparent from the following detailed description of the invention taken in conjunction with the accompanying drawings.

DETAILED DESCRIPTION OF THE PREFERRED EMBODIMENT

Figure 1:
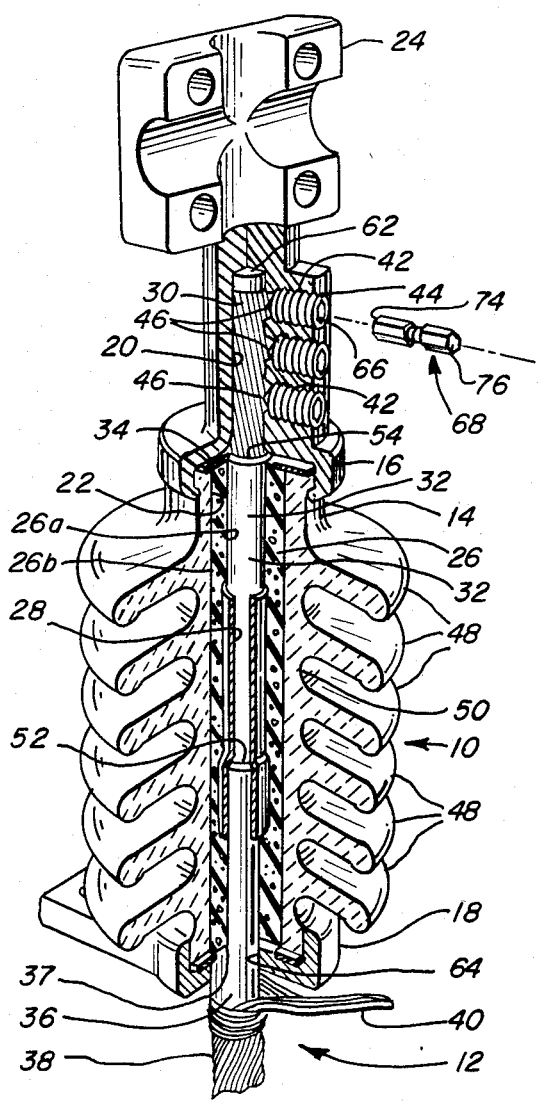
FIG. 1 is a perspective view of a terminator emobdying the present invention installed upon a prepared cable, the terminator being partially in section and having portions broken away to illustrate the interior of the terminator.

Referring now to the drawings, and more particularly to FIG. 1, a terminator installed in accordance with the present invention the present invention is shown generally at 10 upon an insulated, shielded high voltage cable, indicated generally at 12.

The terminator 10 includes a hollow porcelain housing 14 having a metal hood 16 attached to its upper end and a centrally perforated base 18 fixed to its lower end. The hood 16 has a generally cylindrical cavity 20 communicating with an axial bore 22 extending through the housing 14, and includes a pad 24 mounted on top of the hood 16 to provide means for making an electrical connection with an external conductor (not shown). The bore 22 extending through the housing 14 is lined with a sleeve 26 of elastomeric sponge. A tubular stress relief element 28 coaxially grips a portion of the cable 12 within the sleeve 26. The stress relief element 28 slidably engages an inner surface 26a of the sleeve 26. An outer surface 26b of the sleeve contacts the bore 22 of the housing.

Electric current is carried through the cable by a stranded axial conductor 30 which extends upward into the hood cavity 20. A layer of insulation 32 coaxially encasing the axial conductor 30 extends upward approximately as far as the upper edge 34 of the sponge sleeve 26, and a layer of semiconducting material 36 coaxially encasing the insulation 32 extends upward a short distance above the bottom 37 of the sponge sleeve 26. A layer of grounded conductive wire 38 is wrapped around the outside of the semiconducting layer 36 to make electrical contact therewith. The semiconducting and conductive layers 36 and 38 are collectively referred to as shielding. The conductive shielding layer 38 extends upward to a point below the terminator base 18. The various strands of shielding wire which have been removed from the end of the cable may be wound together to form a ground lead 40.

The preferred hood 16 is a one-piece metal casting with three longitudinally spaced, threaded apertures 42 for receiving set screws 44. The apertures 42 are vertically aligned along one side of the hood to communicate with the cavity 20 which receives the upwardly extending axial conductor 30 of the insulated, shielded cable 12. To provide good electrical contact between the axial conductor 30 and the hood 16, the set screws 44 are screwed inward and tightened so that their leading ends 46 spread the strands of the conductor 30 and press them against the interior of the hood cavity 20. The interior of the hood cavity has inwardly extending ridges (not shown) of the type described in Pending U.S. patent application Ser. No. 305,392 formed opposite the set screws to improve electrical contact. Torque limiters 68 are provided for each of the set screws 44. Their function is described below.

The porcelain housing 14 has a plurality of integral rings 48 longitudinally spaced upon a generally cylindrical central portion 50 and extending radially outward therefrom. The shape of the exterior of the housing is helpful in preventing the formation of a current path along the exterior surface of the cable.

The stress relief element 28 is made of a homogeneous elastomer having a relatively high dielectric constant. The dielectric constant of the material is largely determinative of its effectiveness as a stress relief medium. The preferred stress relief element 28 is composed of ethylene-propylene-diene rubber having a dielectric constant of approximately 30. When installed upon a cable end, the stress relief element is in a stretched condition. Its elasticity permits it to securely grip the underlying cable, and further permits a particular size of stress relief element to be used with any cable within a range of sizes.

Figure 2:
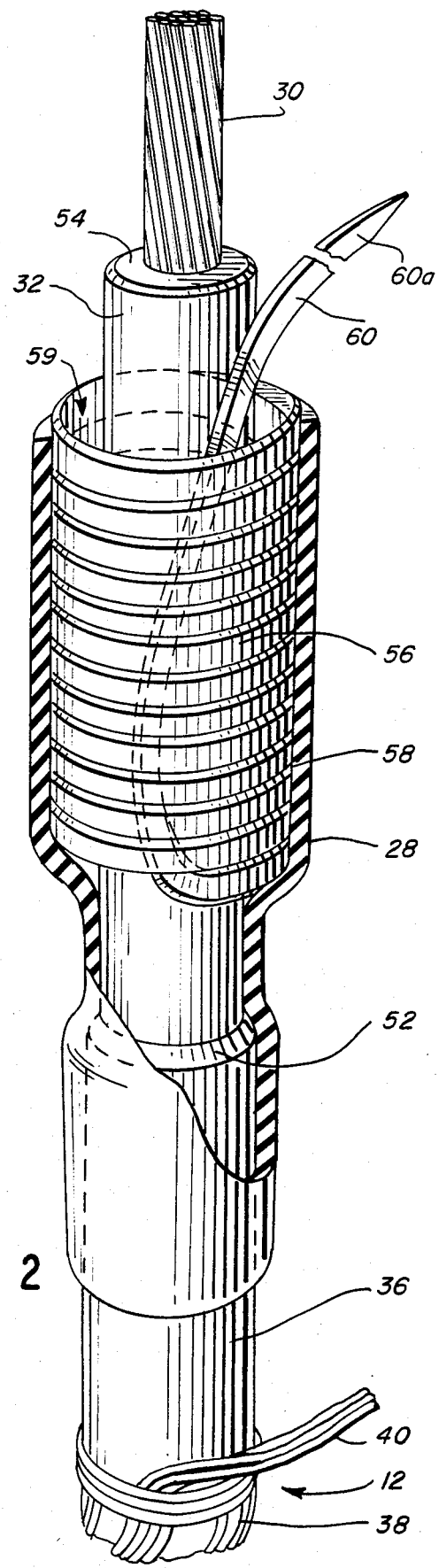
FIG. 2 is an enlarged perspective view illustrating a step in the installation of a stress relief element upon a prepared cable end in accordance with the present invention, the element being partially in section and paritally broken away for clarity.

The sleeve 26 which encases the stress relief element 28 is preferably made of closed-cell ethylene-propylene-diene rubber sponge. The sponge material is compressible so that it permits the prepared end of the cable 10 with the stress relief element 28 mounted thereupon to travel upward through it during installation, and conforms to the peripheral surfaces of the cable 10 and stress relief element 28 after installation has been completed. The compressibility also permits the sleeve to accommodate various cable sizes. The sleeve provides additional dielectric strength outside of the stress relief element and functions to exclude moisture and other contaminants from the interior of the housing. Both the sleeve 26 and the stress relief element 28 may be manufactured relatively inexpensively by extrusion. The first step in the installation of the terminator is the preparation of the cable 12, which includes removal of various lengths of the layers 32, 36 and 38 surrounding the central conductor 30. The outer layer 38 is removed first by bending back the wire shielding to expose a length of the semiconducting layer 36. The wire may then be formed into a ground lead 40 for connection to a grounded terminal (not shown). A circumferential cut is made into the semiconducting layer 36 and an end portion of this layer is removed to expose a length of the underlying insulaton 32. The cut edge 52 of the semiconducting layer 36 best viewed in FIG. 2, is then chamfered. A circumferential cut is made into the exposed insulation 32 and an end portion of this layer 32 is removed to expose a length of the conductor 30. The cut edge 54 of the insulation layer 32 is also chamfered. After the cable has been thus prepared to give it the proper configuration, a thin layer of silicon grease is applied to the chamfered edge 52 of the semiconducting layer 36 to prepare it for installation of the stress relief tube 28.

Referring now to FIG. 2, the elastomeric stress relief element 28 is supported in a highly stretched condition upon a hollow, generally cylindrical core 56 prior to installation. The core 56 is of known design, as described in U.S. Pat. No. 3,515,798, to Sievert, and has a helical groove 58 formed in its outer surface to permit the core to be disassembled into a continuous narrow strip 60 of helically wound material. To install the stress relief element 28 in accordance with the present invention, the prepared cable end is placed within the hollow interior 59 of the core, and an end 60 of the strip of material defined by the helical groove is pulled upward through the interior of the core. As the end of the strip is pulled upward, the core is progressively unwound from the bottom to the top and removed from within the stress relief tube. As the core is removed, the stress relief element 28 progressively contracts to grip the underlying peripheral surfaces of the exposed of insulating material 32 and semiconducting material 36. When the entire core 56 has been removed, the stress relief element 28 is radially stretched and extends upward from a point below the edge 52 of the semiconducting layer to a point above the edge 52, completely covering the edge 52.

Figure 3:
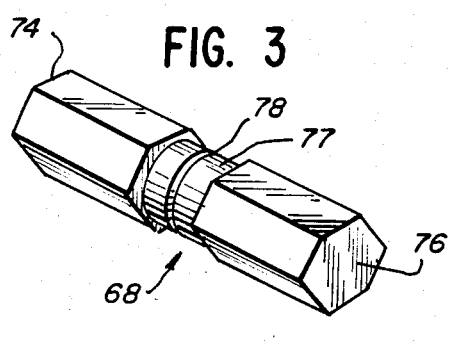
FIG. 3 is an enlarged perspective view of one of the torque limiters employed in the terminator of FIG. 1.

After installation of the stress relief element 28, a rubber cap 62 (FIG. 1) is placed over the exposed end of the conductor 30 to prevent the strands from separating during insertion of the cable into the terminator 10. A contact aid (not shown) is applied to the exposed peripheral surface of te conductor 30, and silicone grease (not shown) is applied to the exposed peripheral surface of the insulation layer 32. The cable end and stress relief element are then inserted through the opening 64 in the base of the terminator 10 and pushed upward, sliding along the inside surface 26a of the sleeve 26 until the top of the conductor cap 62 abuts the top of the hood cavity 20. The set screws 44 are tightened to spread the strands of the conductor 30 and press them against the ridged interior of the hood cavity 20. The preferred set screws 44 have hexagonal sockets 66 at their outer ends. It is preferred that a torque of approximately 40 ft. lbs. be applied to each of the set screws to tighten them. Excessive torque may cause breakage of some of the strands of the conductor 30, which is undesirable. Insufficient tightening of the set screws may result in a poor electrical connection between the stranded conductor 30 and the interior of the hood cavity 20. To tighten the set screws 44 in accordance with the present invention, a torque limiter, indicated at 68, is employed to transmit torque to each of the set screws 44. One head 74 is inserted into the screw socket 66 and the other head 76 is gripped and turned by a wrench (not shown). The torque limiter 68 breaks into two pieces when torsional stress upon the middle portion exceeds a predetermined maximum. One end of the torque limiter 68 remains within the screw socket 66, and the other end may be discarded. The preferred torque limiter 68, best viewed in FIG. 3, is made of stainless steel and has hexagonal heads 74 and 76 at each end of a cylindrical middle portion 77 which has a V-shaped groove extending around its circumference.

From the foregoing it may be seen that a novel terminator is provided which is relatively inexpensive to manufacture and relatively quick and simple to install. Various sizes of terminators with various voltage ratings may be made in accordance with the present invention.

While a preferred emobodiment of the present invention has been described above and illustrated in the accompanying drawings, it wil be appreciated that various other embodiments are within the spirit and scope of the invention. For example, the pad 24 illustrated and described herein is only one of several devices which may be used for securing a conductor to the exterior of the hood. As another example, the insulated, shielded cable received within the terminator 10 may have an outer jacket coaxially engaging the layer of shielding wire, and may have conductive tape rather than conductive wire in its shielding layer. A boot of known design may be employed to cover a portion of such a jacketed cable just below the terminator 10.

The scope of the invention is defined in the appended claims.

What is claimed is:

1. A termination assembly for a high voltage cable having an axial stranded conductor, a coaxial layer of insulation contacting the conductor, a coaxial layer of semiconductive material contacting the insulation, and a layer of grounded conductive wire wrapped around the semiconductive material, the assembly comprising:
   a hood having a generally cylindrical cavity to receive an end portion of the high voltage cable and having means to attach a second conductor to its exterior,
   a rigid housing positioned beneath said hood and attached thereto, said housing including a generally cylindrical interior bore which coaxially surrounds a portion of said high voltage cable beneath and adjacent to said end portion of said axial conductor,
   an elastomeric tubular stress relief element of the type which is installed by releasing it from a highly stretched condition by removing a removable core from its interior coaxially gripping a portion of said cable within said housing in a stretched condition so that said element exerts force radially inward upon the cable, and
   a sleeve of elastomeric material having an outer surface which engages the interior bore of said housing and having an inner surface which slidably engages said stress relief element and portions of said cable adjacent thereto.

2. A termination assembly in accordance with claim 1 wherein the stress relief element coaxially surrounds portions of the layer of semiconducting material and of the layer of insulation.

3. A termination assembly in accordance with claim 2 wherein the stress relief element is composed of a material having a dielectric constant of between 25 and 35.

4. A method for terminating a high voltage cable having an axial stranded conductor, a coaxial layer of insulation encasing the conductor, a coaxial layer of semiconducting material encasing the insulation, and a layer of grounded conductive wire wrapped around the semiconductive material, the method comprising:
   preparing an end of the cable by cutting away an end segment of the grounded wire layer, a shorter end segment of the semiconducting layer, and a still shorter end segment of the insulating layer so that the conductor protrudes longitudinally beyond the insulation and each of the cut layers protrudes beyond the cut edge of the next larger layer surrounding it,
   inserting the prepared cable end into a hollow interior of a core upon which a tubular elastomeric stress relief element is disposed and removing said core to allow said element to contract and grip a portion of the prepared cable end,
   inserting said high voltage cable and the attached stress relief element into an axial bore defined by an extruded elastomeric sleeve disposed within a rigid porcelain housing and pushing the high voltage cable and stress relief element into the bore so that the axial conductor is received within a conductive interior portion of a hood attached to an upper end of the housing, and
   forming an electrical connection between the conductor and the interior of the hood.

5. A method in accordance with claim 4 wherein the portion of the prepared cable end which is gripped by the stress relief element includes the cut edge of the layer of semiconducting material and portions of the semiconducting material and insulation adjacent to the cut edge.

6. A method in accordance with claim 4 wherein making the electrical connection between the central conductor of the cable and the conductive interior of the hood comprises tightening a plurality of set screws extending through threaded openings in said hood to spread the strands of the central conductor and press them against the interior of the hood.

7. A method in accordance with claim 6 wherein tightening said set screws comprises transmitting torque to each of said set screws from a wrench through a torque limiter configured to shear upon application of torsional stress in excess of a predetermined limit.

8. A method in accordance with claim 4 wherein said core is a generally cylindrical structure having a helical groove formed upon its outer surface to define a single continuous helically coiled strip of material and wherein removing said core comprises pulling one end of said strip through the interior of the core.

* * * * *